United States Patent [19]

Breen

[11] Patent Number: 5,226,994
[45] Date of Patent: Jul. 13, 1993

[54] METHOD OF MAKING IMPROVED BAGGAGE TAG STOCK

[75] Inventor: Thomas J. Breen, Northbrook, Ill.

[73] Assignee: Rand McNally & Company, Skokie, Ill.

[21] Appl. No.: 847,582

[22] Filed: Mar. 5, 1992

[51] Int. Cl.$^5$ .................. B32B 29/02; B32B 31/08; G09F 3/04
[52] U.S. Cl. .................. 156/152; 40/630; 156/179; 156/289; 156/324; 283/80
[58] Field of Search .......... 40/630, 6; 283/81, 80, 283/79, 94, 101; 428/40; 156/179, 324, 289, 152, 298

[56] References Cited

U.S. PATENT DOCUMENTS

| | | | |
|---|---|---|---|
| 3,808,718 | 5/1974 | Christiansen | 40/299 |
| 3,994,085 | 11/1976 | Groselak | 283/81 |
| 4,630,384 | 12/1986 | Breen | 24/16 PB |
| 4,631,845 | 12/1986 | Samuel | 40/6 |
| 4,633,276 | 12/1986 | Shibata | 428/40 |
| 4,666,185 | 5/1987 | Pilborough | 283/81 |
| 4,817,310 | 4/1989 | Breen | 40/299 |
| 4,954,814 | 9/1990 | Benge | 156/152 |
| 5,092,949 | 3/1992 | Goncalves | 156/179 |
| 5,139,847 | 8/1992 | Breen | 283/81 |

*Primary Examiner*—Michael W. Ball
*Assistant Examiner*—Daniel J. Stemmer
*Attorney, Agent, or Firm*—Dressler, Goldsmith, Shore, Sutker & Milnamow, Ltd.

[57] ABSTRACT

A method of making thermally imprintable baggage tag stock is disclosed. The steps comprise providing a first continuous web of a dense bond paper having inner and outer surfaces, providing a second continuous web of paper having inner and outer surfaces and having a release coating on its inner surface, providing continuous fibers between the inner surfaces of said first and second webs, continuously depositing an adhesive on the release coating for enveloping the fibers, and continuously joining the webs and fibers to permanently bond the fibers to the inner surface of the first web. Thereafter the webs are continuously separated at the release coating of the second web and a pressure-sensitive adhesive is deposited between the webs, and the webs are continuously rejoined to adhere the pressure-sensitive adhesive to the surface of the first web to which the fibers are bonded.

6 Claims, 1 Drawing Sheet

METHOD OF MAKING IMPROVED BAGGAGE TAG STOCK

BACKGROUND OF THE INVENTION

Baggage tags are widely used by airlines and others. A variety of such tags exist. One type of tag has a thermally imprintable outer surface, and a pressure-sensitive adhesive inner surface by which the tag may be adhered to itself, as around a handle.

In Breen et al. U.S. Pat. No. 4,817,310 a baggage tag formed of a laminate of multiple layers is disclosed. One layer has a thermally sensitive coating and is preferably highly calendered. A less expensive layer such as kraft paper, is used to sandwich longitudinally running fibers between it and the highly calendered layer. A pressure-sensitive adhesive is disposed on the less expensive layer and is covered by a peelable release strip.

The baggage tag of that application is highly effective in use. However there are circumstances in which thinner, lighter weight and less expensive tag stock would be desirable. It would be desirable to produce such tag stock and to provide an improved method for making such tag stock.

SUMMARY OF THE INVENTION

In accordance with the method of the present invention fiber reinforced thermally imprintable baggage tag stock which is thinner, less stiff and less expensive than prior art baggage tag stock is provided. In particular such tags are producible without a second permanent layer for sandwiching the longitudinally running fibers. To that end, the method of the invention comprises the steps of providing a first continuous web of a dense bond paper having a thermally imprintable layer on its outer surface, providing a second continuous web of paper having a release coating on its inner surface, providing continuous fibers between the inner surfaces of the first and second webs, depositing an adhesive on the release coating, joining the webs with the fibers between them to permanently bond and laminate the fibers to the inner surface of the first web while embedding the fibers on the adhesive layer, and thereafter continuously separating the first and second webs, depositing a pressure-sensitive adhesive between the webs, and rejoining the webs to adhere and laminate the pressure-sensitive adhesive to the surface of the first layer to which the fibers are bonded. Desirably the fibers are embedded in the adhesive layer prior to joining the webs.

Although the method may be carried out continuously, it is also possible to practice the method by joining the webs and fibers to bond the fibers to the inner surface of the first web and storing the intermediate product as in rolls, and thereafter carrying out the steps of separating the webs, depositing the pressure sensitive adhesive between them, and rejoining the webs to produce the finished product.

Further objects, features and advantages of the present invention will become apparent from the following description and accompanying drawings.

DESCRIPTION OF THE PRESENTLY PREFERRED EMBODIMENT

Figure 1:
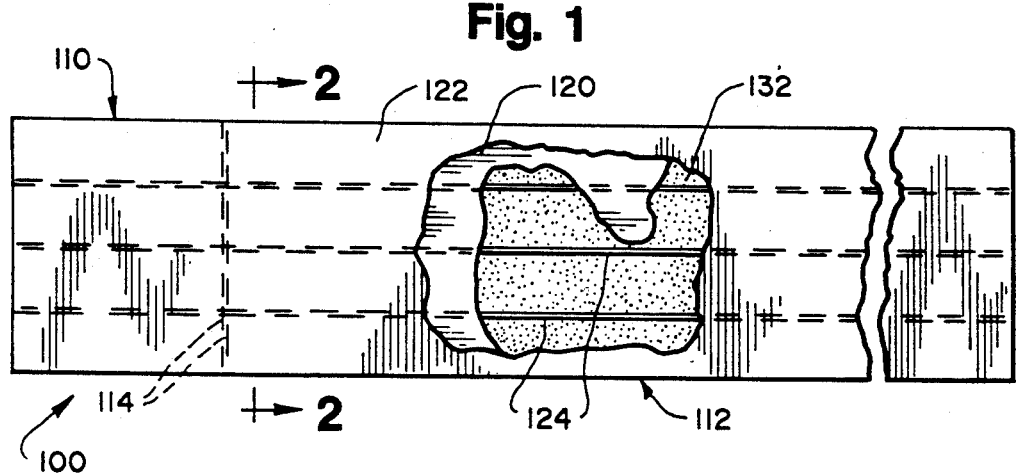
FIG. 1 is a plan view of a baggage tag made in accordance with the present invention.
Figure 2:
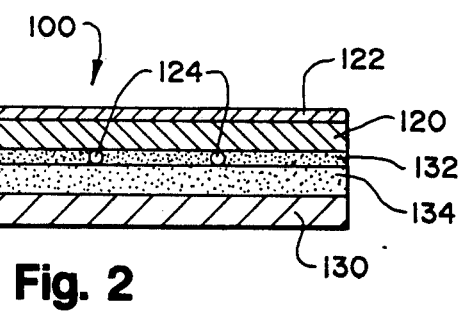
FIG. 2 is an enlarged cross-sectional view of the baggage tag of FIG. 1 taken along line 2—2 of FIG. 1.

Referring now to the drawings, a thermally imprintable baggage tag 100 made in accordance with the method of the present invention is shown in FIG. 1. Baggage tag 100 is ultimately separable into a claim check portion 110 and a baggage tag portion 112 along a transverse score means or line of severance 114 in a zone of separation such as a closely adjacent pair of lines of perforations to assure that the fibers to be described are cut through in the zone of separation.

The baggage tag 100 is elongate and generally rectangular. It comprises a heavy weight, high fiber content, highly calendered first paper sheet 120, such as a 20 pound bond paper coated with a thermally sensitive coating or layer 122. Layer 122 may be overprinted by a conventional non-thermal printing process with selected printed information, such as the name of a carrier, its logo, other constant data, etc.

Baggage tag 100 also incorporates a series of longitudinally extending, spaced apart and generally parallel reinforcing fibers 124. Fibers 124 desirably run only in the direction of the lengths of the continuous webs, i.e., longitudinally only, and desirably may be glass fibers. Preferably the fibers 124 comprise bundles of fine glass fibers which are bundled for ease of assembly of the components of the baggage tag stock during manufacture. The fibers 124 may be spaced equidistantly. Alternatively, the distance between them may vary somewhat, preferably within a range of from no less than about ⅛ inch and no more than about 1 inch. It may be desirable to leave the central region of the baggage tag free of fibers to enhance the flatness of that region of the tag for most effective printing of the baggage tag stock and most effective thermal printing.

The baggage tag 100 further comprises two adhesive layers and a coated release liner or layer 130. Layer 130 may be a conventionally used liner paper, such as a 17 pound supercalendered liner paper coated with a conventional silicone release coating. The fibers themselves are permanently adhered to the inner surface of sheet 120 by an adhesive layer 132. The fibers 124 and adhesive layer 132 are covered with a pressure sensitive adhesive layer 134 which releasably adheres liner layer 130 thereto. The layer 130 is easily and readily removable from the baggage tag simply by peeling it away in a known manner.

As will be clear, baggage tag 100 is different in basic construction from the baggage tag illustrated and described in Breen et al. U.S. Pat. No. 4,817,310. Not only is it different in that its components are fewer and its construction is different, but its fabrication has been simplified as well.

Figure 3:
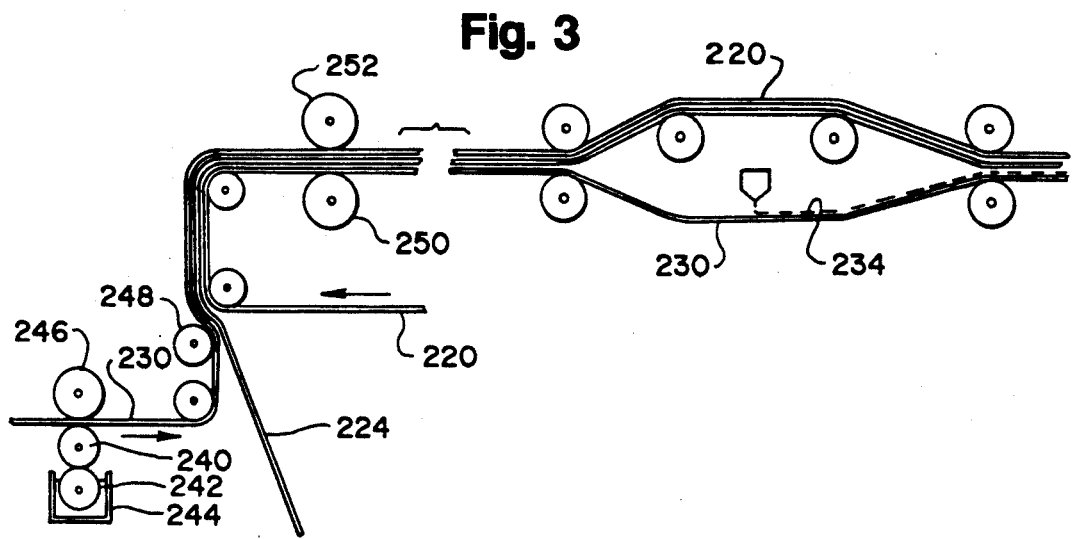
FIG. 3 is a schematic representation of a process for making the baggage tag stock of FIG. 1.

Referring now to FIG. 3, it will be apparent that baggage tag stock is formed in a continuous web from which lengths of associated baggage tags or individual elongate baggage tags may be severed at an appropriate time in the manufacturing process or for use.

Starting at the left of FIG. 3, it will be seen that a continuous supply or web 220 of a suitable bond paper, a continuous supply of spaced fibers 224 and a continuous supply or web of a coated release paper liner 230 are provided and that they move from left to right. Web 220 is a high fiber, highly calendered dense paper of at least about 18 pound weight, such as a 21 pounds per ream (17 inch×22 inch —500 sheet) weight Appleton bond paper having a caliper of 0.029 to 0.035 inch. Web 220 may be precoated with a thermally sensitive coating 222. A suitable thermally coated paper is available from Appleton Papers Inc., Appleton, Wis., as 21#T0962A Optima paper. Another suitable paper is available from Ricoh Electronics of Santa Ana, Calif., and is identified as 120 LAM thermal paper of about 18 pound basis weight per ream (17 inch×22 inch —500 sheet) having a caliper of 0.031 inch. The bundles of fibers 224 are typically about 1/32 inch in diameter. The bundles may comprise about 750 fibers and the bundles are spaced apart by about ¼ inch from each other.

Adhesive is continuously deposited at an adhesive depositing station on the release coated surface of the liner web 230, as from a steel metering roll 240 supplied by a supply roll 242 which rotates in an adhesive supply receptacle 244. A rubber nip roll 246 cooperates to deposit a uniform adhesive layer 232 of desired thickness on the web 230. The adhesive coated web is then fed to a zone at which the supply of fibers 224 and the thermal paper web 220 are joined with the adhesive coated release liner. The mating roll 248 serves to embed and envelope the fibers in the adhesive and to join the webs and fibers, and to maintain the smoothness of the thermal paper. Desirably the fibers are presented to the adhesive at roll 248 at an angle at which they bear against the adhesive layer on the release paper such that they tend to be embedded in the adhesive immediately prior to the presentation of the joined fibers and adhesively coated web to the thermal web 220.

The assembled webs and fibers are then passed through a pair of nip rolls, steel roll 250 and rubber surfaced roll 252, to securely laminate the webs and fibers to each other. Care is taken so that the thermal paper is not indented, i.e., to preserve its smoothness as much as possible, thereby avoiding headwear in the thermal printer employed when the finished product is printed and to provide the best surface for producing the highest quality thermal image. The coated release web 230 remains releasably adhered to the adhesive layer 232. If the temperature of the adhesive is such that when it contacts the thermal web it might activate the thermal coating, it is desirable to use a chilled roll against the thermal web to reduce its temperature during the processing. The liner paper may have a nominal basis weight of about 42 or 43 pounds and have a caliper of 0.025 to 0.034 inch. A suitable adhesive is a hot melt amorphous polypropylene adhesive.

At this point the assemblage described may be wound into a roll for storage and subsequent use in the manner to the described. Alternatively, when feasible the process may be continuous.

The next step in the process, after inverting the assemblage so that adhesive may be applied to the upwardly facing release coating, involves the delamination or separation of the coated release web 230 from the confronting adhesive layer. Because the web 230 is releasably adhered to the adhesive layer 232, it is easily delaminated or peeled away from the adhesive layer 232 on a continuous basis. The web 230 retains its release characteristics, i.e., the release characteristics of the silicone or other like coating, and, as will be seen, is available to be used again as a transfer medium for receiving and transferring a further adhesive, such as a suitable pressure sensitive adhesive to the back of the adhesive coated paper supply 220. Thus, as seen in FIG. 3, the liner web 230 is continuously delaminated and peeled away and becomes spaced away from the adhesive coated paper web 220. The liner 230 is then continuously presented to a hot melt pressure-sensitive adhesive supply station to provide a continuous layer of pressure sensitive adhesive 234 on the liner web 230. The webs 220, 230 are again nipped to laminate the assembly, i.e., to adhere the pressure sensitive adhesive 234 to the inner surface of web 220. The release liner web is again releasably adhered to the adhesive layer 234, and may be readily peeled away from the associated layers in a known and conventional manner later when the individual baggage tags made in accordance with the method described are to be used.

The thusly formed baggage tag stock may then be partially or fully processed or may be separated into individual baggage tag supply increments, as by winding or fan-folding them for storage, depending upon the use to which the baggage tags are to be put. Typically, continuous supplies may be wound into rolls, after being partially processed or converted for use, and into rolls of a size which are adapted for use in continuous dispenser machines in which they are finally thermally imprinted with customized data of interest such as flight number, names, etc., and are then cut to length and dispensed for use at the site, such as at a baggage receiving station at which they are intended to be used.

Depending upon how the baggage tag is to be used, the individual tags may be provided with lines of serration, preferably by also cutting through the fibers, along which the claim check and baggage tag portions may be severed. Lines of serration, butt cuts and other weakening for facilitating separation and use of individual baggage tags made in accordance with this invention may be employed in the manner described in the above-mentioned Breen et al. patent.

While a preferred embodiment of the method of the present invention has been illustrated and described herein, it will be appreciated by those skilled in the art that changes and variations may be made therein without departing from the spirit and scope of the invention. Accordingly, the invention is not to be construed as being limited, except as may be required by the appended claims.

What is claimed is:

1. A method of making thermally imprintable baggage tag stock comprising the steps of
providing a first continuous web of a dense bond paper having inner and outer surfaces,
providing a second continuous web of paper having inner and outer surfaces and having a release coating on its inner surface,
providing continuous fibers between the inner surfaces of said first and second webs,
continuously depositing an adhesive on the release coating, and
continuously joining the webs and fibers to embed the fibers in the adhesive and to permanently bond the adhesive and embedded fibers to the inner surface of the first web, and thereafter
continuously separating the second web from the first web and joined adhesive and embedded fibers,
continuously depositing a pressure-sensitive adhesive between the webs, and continuously rejoining the webs to adhere the pressure-sensitive adhesive to the surface of the first web to which the fibers are bonded.

2. The method of making the thermally imprintable baggage tag stock of claim 1, and wherein the fibers extend only in the direction of the lengths of the continuous webs.

3. The method of making the thermally imprintable baggage tag stock of claim 1, and comprising the further step of winding the webs and adhesive embedded fibers into a roll for interim storage after they are continuously joined, and thereafter unwinding them and then carrying out the steps of continuously separating and continuously rejoining them.

4. The method of making the thermally imprintable baggage tag stock of claim 1, and wherein the fibers are embedded in the adhesive prior to joining the first web thereto.

5. A method of making thermally imprintable baggage tag stock comprising the steps of providing a first continuous web of a dense bond paper having inner and outer surfaces, providing a second continuous web of paper having inner and outer surfaces and having a release coating on its inner surface, providing continuous fibers between the inner surfaces of said first and second webs, continuously depositing an adhesive on the release coating, and continuously embedding the fibers in the adhesive layer and then joining the webs to permanently bond the adhesive and embedded fibers to the inner surface of the first web.

6. The method of making the thermally imprintable baggage tag stock of claim 5, and comprising the further step of winding the webs and fibers into a roll for interim storage after they are continuously joined, and thereafter unwinding them, and then continuously depositing a pressure-sensitive adhesive between the webs, and continuously rejoining the webs to adhere the pressure-sensitive adhesive to the surface of the first web to which the fibers are bonded.

* * * * *